(12) United States Patent
Lenssen et al.

(10) Patent No.: US 7,234,154 B2
(45) Date of Patent: Jun. 19, 2007

(54) INFORMATION CARRIER, APPARATUS, SUBSTRATE, AND SYSTEM

(75) Inventors: Kars-Michiel Hubert Lenssen, Eindhoven (NL); Cornelis Maria Hart, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/257,171

(22) Filed: Oct. 24, 2005

(65) Prior Publication Data

US 2006/0048177 A1  Mar. 2, 2006

Related U.S. Application Data

(62) Division of application No. 09/940,044, filed on Aug. 27, 2001, now Pat. No. 6,986,151.

(30) Foreign Application Priority Data

Sep. 22, 2000  (EP)  ................... 00203298

(51) Int. Cl.
*G11B 7/24* (2006.01)

(52) U.S. Cl. .................................. 720/718

(58) Field of Classification Search ............. 720/718, 720/719; 369/14, 52.1, 100, 273
See application file for complete search history.

(56) References Cited

U.S. PATENT DOCUMENTS

| | | | |
|---|---|---|---|
| 4,868,373 A | 9/1989 | Opheij | |
| 5,119,353 A | 6/1992 | Asakura | |
| 5,862,117 A | 1/1999 | Fuentes | |
| 6,044,046 A | 3/2000 | Diezmann | |
| 6,373,799 B1 | 4/2002 | Ono | |
| 6,806,842 B2 * | 10/2004 | King et al. | 343/795 |
| 6,924,781 B1 * | 8/2005 | Gelbman | 345/85 |

FOREIGN PATENT DOCUMENTS

| | | |
|---|---|---|
| DE | 19616819 A | 10/1997 |
| WO | WO 98/40930 | 9/1998 |

* cited by examiner

Primary Examiner—Angel Castro
(74) Attorney, Agent, or Firm—Michael E. Belk

(57) ABSTRACT

An information carrier contains a storage unit, an integrated circuit and a first and a second coupling element. The coupling elements are intermediate in the transfer of data, and energy from a base station to the integrated circuit, and vice versa. Between the base station and the coupling elements, the transfer of data and energy is contactless, such as by capacitive coupling. Between at least the first and/or both of the coupling elements, data and energy are transferred by the of capacitive coupling. The base station may be in an apparatus containing a reading device of the storage unit. To facilitate the capacitive coupling, the base station contains first and second capacitor plates. The information carrier and the apparatus with the base station containing said capacitor plates together constitute the system, which is suitable for copy protection of the information on the storage unit.

4 Claims, 4 Drawing Sheets

INFORMATION CARRIER, APPARATUS, SUBSTRATE, AND SYSTEM

CROSS REFERENCE TO RELATED APPLICATION

This is a divisional of prior application Ser. No. 09/940,044 filed Aug. 27, 2001, issued as U.S. Pat. No. 6,986,151.

The invention relates to an information carrier provided with a storage unit, an integrated circuit, and a first coupling element for the transfer of data between a base station and the integrated circuit.

The invention also relates to an apparatus comprising a device for reading out information from the storage unit of an information carrier, which apparatus is further provided with an integrated circuit and with a first coupling element and further comprises a base station for the transfer of data to the integrated circuit via the first coupling element.

The invention further relates to a system of an information carrier and an apparatus, said information carrier being provided with a storage unit, an integrated circuit, and a first coupling element, while said apparatus is provided with a base station for the transfer of data from and to the integrated circuit of the information carrier and with a device for reading out information from the storage unit of the information carrier.

The invention further relates to a substrate provided with a layer of conductive ink and a glue layer.

Such an information carrier, such an apparatus, and such a system are known from DE-A 19616819. The known information carrier has the form of a CD and consists of three layers: a layer which carries the information and in which the storage unit and the integrated circuit are present, a metal layer, and a protective layer. The first coupling element may be formed by the metal layer, with which the integrated circuit is then in contact. The first coupling element may alternatively be present on the integrated circuit, which will also be referred to as IC hereinafter. Transfer of data to the base station takes place through the first coupling element by means of inductive or capacitive coupling.

It is a disadvantage of the known information carrier that the transfer of energy and that of data are not integrated if the data transfer takes place through capacitive coupling. The known information carrier comprises a separate device for the energy supply to the IC. This device is a battery or a second coupling element, such as a coil or a second capacitor plate. Since the IC and the device are to be connected to one another, the construction of the information carrier which is connected to the base station through capacitive coupling is complicated. This renders the use of a capacitive coupling for the purpose of protection of information stored in the storage unit of the information carrier expensive.

It is a first object of the invention to provide an information carrier of the kind described in the opening paragraph which can be manufactured in a simple manner.

It is a second object of the invention to provide an apparatus of the kind described in the preamble whose base station is coupled to an information carrier by means of capacitive coupling.

It is a third object of the invention to provide a system of the kind described in the preamble in which information stored in the information carrier is security-protected by means of a code stored in an IC.

The first object is achieved in that
in addition to the first coupling element, a second coupling element is present for the transfer of data and energy between a base station and the integrated circuit,
the first and the second coupling element are each coupled to both the base station and the integrated circuit in the operational state, said coupling elements being coupled contactlessly to the base station, while the first coupling element is coupled to the integrated circuit through capacitive coupling.

The IC in the information carrier according to the invention is connected to the base station by a first and a second coupling element. It was found that the first and the second coupling element can be coupled both to the base station and to the integrated circuit through capacitive coupling. It may be advantageous, however, to create an electrically conductive connection between the integrated circuit and the second coupling element; for example owing to a manufacturing method whereby the ICs are placed on a conductive substrate provided with a layer of electrically conductive glue. It may also be advantageous to make the coupling between the coupling elements and the base station inductive or electromagnetic.

Since the coupling between the IC and the coupling elements can be contactless in the information carrier according to the invention, no wire connections are present between these elements. As a result, the information carrier provided with the storage unit and the IC has a construction of components which is not or substantially not complicated. Thus the IC need not be placed in an accurately defined position. Patterning of an electrically insulating layer for the provision of the direct contact connections is unnecessary. The advantage of this is that it leads to a considerable cost saving. The assembly of such connections is indeed a costly step in the manufacture. In addition, wire connections are usually vulnerable components. Rejects and malfunctioning are avoided through their absence.

Whereas it is stated in the prior art that no simultaneous transfer of data and energy is possible in the case of capacitive coupling, this is in fact realized in the information carrier according to the invention. A voltage and a current are supplied to the coupling elements, and thus to the IC, by the base station. Voltage and current may have the same frequency, but this is not necessarily the case. Preferably, the current has a lower frequency. The IC contains a memory with a code, preferably consisting of a start bit, a number of data bits which may be programmed as "1" or "0", and a number of stop bits. The IC requires a certain amount of current in dependence on a serial reading of the code. The data are contained in this variable current demand. It is also possible for data to be present already in the current supplied by the base station to the IC.

In a favorable embodiment, the coupling elements are coupled to the base station by means of capacitive coupling. In this embodiment, the coupling elements each comprise an electrically conductive plate, and the base station comprises at least two electrically conductive plates. These plates form capacitors in conjunction with the interposed dielectric which is at least partly formed by air. It was found that a capacitor with a capacitance of the order of 1 pF suffices for the transfer of energy at a frequency of 125 kHz. If the conductive plate has a surface area of approximately $12 \times 10^{-4}$ m$^2$, the distance between the conductive plate of the base station and that of the coupling element may be approximately 1 cm.

In an alternative embodiment of the information carrier according to the invention, the first and the second coupling element are coupled to the base station by means of inductive coupling, for which purpose the first coupling element is at least partly spiraling in shape, and the second coupling element is electrically connected to the first. The electrical connection between the first and the second coupling element is realized, for example, in the form of a capacitive coupling. It is an advantage of the embodiment that coupling to the base station may take place over a distance which is normally greater than in the case of capacitive coupling.

The at least partially capacitive coupling between the IC and the first and the second coupling element is preferably realized in the presence of two conductive plates in the IC and one conductive plate in each of the coupling elements. These plates are positioned such that there will be an overlap in the case of perpendicular projection of one of the plates in the IC onto the plate of one of the coupling elements. The conductive plates may comprise as the electrically conductive material inter alia a metal, such as copper or aluminum, a semiconductor such as silicon, a conductive ink, or a conductive polymer.

Preferably, the first and the second coupling element are each formed by a conductive plate which may or may not be patterned. Preferably, this plate is larger than the conductive plate of the IC, so that the base station and the coupling element can be coupled at a sufficient distance. The plate may have various shapes: for example circular, annular, rectangular, both square and oblong, or be composed of several shapes.

Preferably, the integrated circuit contains data and is capable of processing data, without which data no or no correct processing of the information stored in the storage unit is possible. The IC for this purpose comprises a microprocessor by means of which algorithms can be carried out, and a memory on which security structures and associated codes are provided. A copying and playback protection for software and digitally encoded information, such as images and music, is realized thereby, or an access authorization check to the information is achieved. Security structures and associated codes are known to those skilled in the art of copying protection. Alternatively, the IC may be constructed for the storage of data, for example for storing intermediate results such as a table of contents, for determining the track sequence and the access control.

It is possible for the information carrier to comprise more than one IC. A reason for providing several ICs on one information carrier is, for example, that the ICs perform different functions, the one IC comprising an electrically programmable memory and the other IC a preprogrammed memory.

The storage unit in the information carrier according to the invention may be realized in various ways. The storage unit may be magnetically readable. Examples of this are hard disks and tapes. The storage unit may be electronically readable. Examples of this are non-volatile memories such as EEPROM, Flash, and MRAM.

In an embodiment of the information carrier according to the invention, the information carrier is constructed as a disc, and the information stored in the storage unit is optically readable. The information carrier is, for example, a CD which may be rewritable, a CD-ROM, or a DVD which may or may not be rewritable. It is desirable especially in the case of such information carriers to integrate an IC in the information carrier. A copying and playback protection for software and digitally encoded information, such as images and music, is realized thereby, or the access to the information can be controlled. Alternatively, the IC may be constructed for the storage of data, for example for storing intermediate results such as a table of contents, for determining the track sequence and the access control.

In a further embodiment, the disc comprises:
an information-carrying layer provided with the storage unit,
a metal layer serving as one of the coupling elements,
a protective layer of electrically insulating material, and
a layer of electrically insulating material serving as the other coupling element, which layer is electrically insulated from the metal layer, wherein the integrated circuit is present between the first and the second coupling element.

In this embodiment, the IC is present in the layer of electrically insulating material which is provided with the storage unit, or in the protective layer. The two conductive plates of the IC are present at two sides of the IC facing away from one another in this embodiment. One of these sides faces the metal layer, the other one faces the layer of electrically conductive material. An advantage of the embodiment is that the conductive plates may cover the relevant sides of the IC entirely. This increases the capacitance value of the capacitive coupling. Preferably, the one side is the lower surface of the IC and the other side the upper surface, and the IC has a substrate of doped silicon which at the same time forms the conductive plate at the lower surface.

A further advantage of the embodiment is that the IC is enveloped by the layer in which it is present. A separate envelope is accordingly unnecessary. Preferably, the IC is provided during the manufacture of the disc already in that the IC is placed in an injection mold. The layer is subsequently injected into the mold, so that the IC becomes integrated into the layer. Furthermore, the metal layer forms the first coupling element in this embodiment. This metal layer is a standard component of a disc with an optically readable storage unit. The second coupling element lies at the side of the layer having the storage unit or of the protective layer, depending on the position of the IC. This second coupling element, and the IC, are present preferably adjacent the center of the disc, around a hole which is normally present anyway.

In a specific embodiment, the disc is provided with an inner, an intermediate, and an outer ring, which rings are concentric. The metal layer then lies in the inner and the outer ring, and the layer of electrically conductive material in the inner and the intermediate ring. This embodiment is characterized in that the layers lie for the major part next to one another upon a perpendicular projection of the layer of electrically conductive material on the metal layer. The advantage of this manifests itself in the construction of the base station. If the coupling between coupling elements and the base station is capacitive, the base station will comprise two capacitor plates. Since the layers lie next to one another for the major part, the two capacitor plates can be placed next to one another—or as two concentric rings one around the other—in the base station instead of opposite to one another.

In an alternative embodiment, the disc comprises an inner ring and an outer ring of conductive material, which inner ring is one of the coupling elements, while the outer ring is the other coupling element. Furthermore, the two conductive plates of the IC lie at least next to one another at the side of the IC facing the metal layer. To simplify positioning of the IC, it is advantageous to construct the conductive plates as U-shaped plates, similar to the construction of SMD contacts. The coupling elements of this disc can also be read out by means of two capacitor plates which are positioned in the base station next to one another or as two concentric rings one around the other. Preferably, the inner ring and the outer ring are formed by a structured metal layer. The metal layer is structured, for example, through the presence of a circular groove.

In a further embodiment, the conductive material is a conductive ink. This conductive ink may be provided in a simple manner through printing. Alternatively, the conductive ink may be provided as a component of a multilayer stack comprising a substrate of electrically insulating material, the conductive ink, and a glue layer. Such a multilayer stack is preferably provided in the form of a sticker. Once this sticker, preferably having the shape of a ring, has been applied on the disc, the second coupling element is automatically protected by the substrate.

The second object of the invention of providing an apparatus of the kind described in the preamble, whose base station is coupled to an information carrier by capacitive coupling, is achieved in that the apparatus is suitable for an information carrier, and
the base station comprises a first and a second capacitor plate for the transfer of data and energy from and to the integrated circuit of the information carrier, by means of which capacitor plates the base station is coupled to the first and the second coupling element of the information carrier through capacitive coupling in the operational state.

In contrast to the apparatus known from the prior art, which only comprises a first capacitor plate, the apparatus according to the invention comprises not only the first, but also a second capacitor plate. These two capacitor plates in the base station are both coupled to a supply source and to a device for reading and optionally writing of data from or into the IC on the information carrier. The supply source and the device may be constructed, each separately or jointly, as an integrated circuit. Such a device and such a supply source, whether or not jointly integrated, are known to those skilled in the art of electronics. Preferably, the device is a receiver with a good dynamic range. Preferably, the supply source is capable of generating high-frequency energy. It is furthermore known to those skilled in the art that a device for writing of information onto the storage unit of the information carrier may furthermore be present in the apparatus. This device may also be integrated into the device for reading of information from the storage unit.

In a favorable embodiment of the apparatus according to the invention, the apparatus is suitable for use with the information carrier which in the operational state is clamped in between a carrier body and a compression body of the apparatus. For this purpose, the first capacitor plate forms part of the carrier body, and the second capacitor plate forms part of the compression body. The apparatus in this embodiment is suitable for information carriers which have the shape of a disc. The compression body or the carrier body is connected to an electric motor and causes the disc to rotate. The other one of said bodies mainly serves as a mechanical support. The integration of a capacitor plate into each of the two bodies renders it possible for the two capacitor plates to have a large surface area. This promotes the speed and extent of the transfer of data and energy. It is an advantage of the embodiment that an electric circuit is formed also in the absence of an information carrier in the apparatus.

In a further embodiment of the apparatus according to the invention, the carrier body and the compression body each have a surface, the two bodies directly facing each other with said surfaces if no information carrier is present in the apparatus, while the first coupling element is present at or immediately below the surface of the carrier body. The first coupling element may be present in the carrier body at any distance from the surface, provided the carrier body is manufactured from an electrically insulating material. The first coupling element is preferably situated immediately below or at this surface. This limits the distance from the first coupling element of the apparatus to the coupling elements in the information carrier, and thus simplifies the transfer of data and energy. Preferably, the first coupling element is covered by a protective layer. A similar preference holds obviously for the second coupling element.

In an alternative embodiment, the apparatus is provided with a carrier body for the information carrier. The carrier body for this purpose has an inner ring and an outer ring, which rings are concentric. The first capacitor plate lies inside the outer ring, and the second capacitor plate lies inside the inner ring. The first and the second capacitor plate are both present in or on the carrier body in this embodiment. This is advantageous for the construction of the apparatus.

The third object of the invention is achieved in that the information carrier is provided with a storage unit, an integrated circuit, and a first and a second coupling element,
the apparatus is provided with a device for reading information from the storage unit of the information carrier, further comprising a base station with a first and a second capacitor plate for the transfer of data and energy from and to the integrated circuit of the information carrier,
the first and the second coupling element are each coupled to both the base station and the integrated circuit in the operational state, and
the first and the second coupling element are coupled to the base station by capacitive coupling, and the first coupling element is coupled to the integrated circuit by capacitive coupling.

In this system, the information stored in the information carrier is protected by an identification code stored in a memory of the IC, and the system operates by means of capacitive coupling. The system comprises the information carrier and the apparatus.

The identification code may be tested against the whole or parts of the information of the storage unit of the information carrier. Preferably, a verification routine is stored in the storage unit. Alternatively or additionally, the apparatus comprises the verification routine, for example in the base station. A processor contained in the base station, or alternatively contained in the IC, runs the verification routine and checks the identification code. The processor blocks access to the storage unit, unless the memory of the IC contains the correct code. Illegal copies of the information in the storage unit are thus useless to a high degree without an accompanying copy of the identification code in the memory of the IC. It is thus possible also for CDs not containing software but, for example, music to be protected against illegal copying.

Preferably, at least a portion of the memory of the IC is programmable once only, so that the identification code cannot be changed inadvertently or on purpose by a user of the information carrier. Alternatively, the memory of the IC may be electronically programmable, for example an EEPROM. In that case, the verification routine is capable of adapting the identification code at regular intervals on the basis of instructions in the storage unit of the information carrier for the purpose of counteracting an unauthorized inspection of the identification code.

Preferably, the second coupling element is also capacitively coupled to the integrated circuit. A further preference is that the information carrier is constructed as a disc, and the information stored in the storage unit is optically readable.

The invention furthermore provides a substrate of the kind mentioned in the preamble which is highly suitable for use in the manufacture of the information carrier according to the invention. To achieve this, the substrate is suitable for fastening to a disc-shaped information carrier having a central hole in the information carrier with a diameter, the substrate being provided with a hole with a diameter which is at least equal to the diameter of the hole in the information carrier.

These and other aspects of the information carrier, the apparatus, the system, and the substrate according to the invention will be explained in more detail below with reference to the drawings, in which FIG. 1 is a diagrammatic plan view of a first embodiment of the information carrier;

Figure 1:
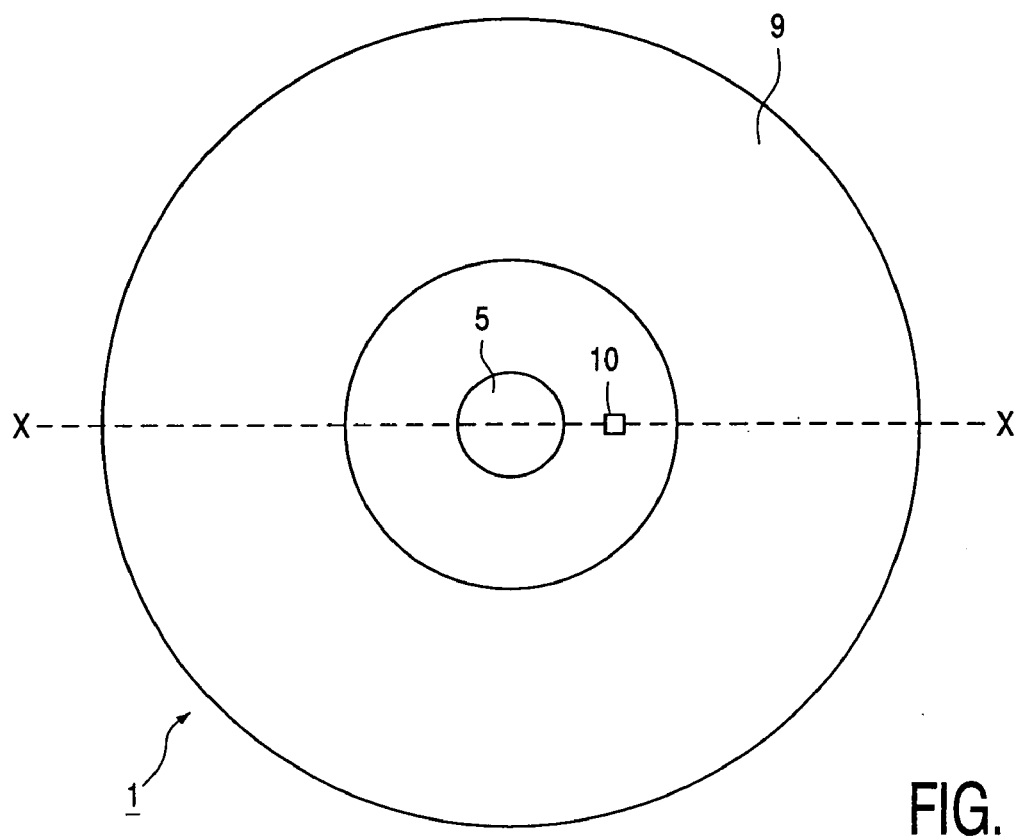

The Figures are diagrammatic and not true to scale, and corresponding components have been given the same reference numerals. It will be obvious to those skilled in the art that alternative, equivalent embodiments of the invention are possible without departing from the essence of the invention, and that the scope of the protection of the invention is limited by the claims only. Thus the following embodiments are described with reference to an information carrier with a storage unit which is readable only, such as a CD or a CD-ROM. It will be obvious that the principles of the invention may be applied to other rotating information carriers such as CD-R, DVD, DVD-R, CD-I, and other known information carriers in which information is stored by optical, electronic, mechanical, or magnetic methods.

FIG. 1 shows the information carrier 1 according to the invention which in this example is a disc with an optically readable storage unit 9. The information carrier 1 is provided with a hole 5 centrally situated in the disc and with an integrated circuit (IC) 10.

Figure 2:
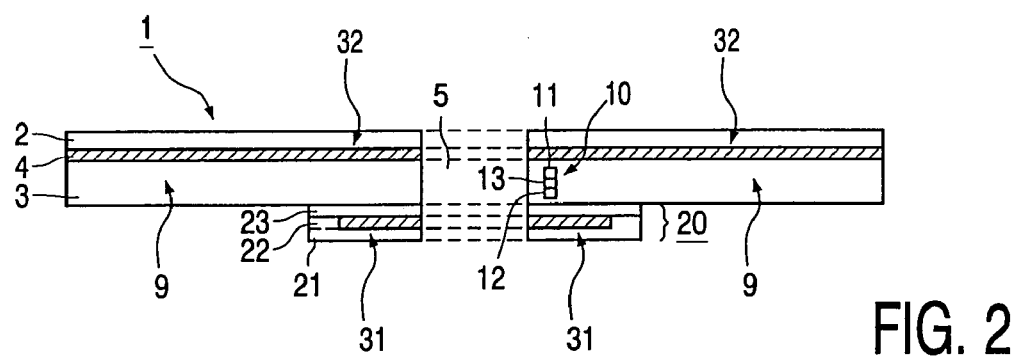
FIG. 2 is a diagrammatic cross-sectional view of the first embodiment taken on the line X—X in FIG. 1.

FIG. 2 is a diagrammatic cross-sectional view of the information carrier 1 taken on the line X—X in FIG. 1. The integrated circuit 10 is provided with a conductive plate 11 at the upper surface and a conductive plate 12 at the lower surface. IC elements 13 are present therebetween, such as a memory and a processor. The disc comprises a number of layers, i.e. the protective layer 2, the information-carrying layer 3 of electrically insulating material provided with the storage unit 9, the metal layer 4, and the stack 20 comprising a substrate 21, a layer 22 of electrically conducting material, and the glue layer 23. The stack 20 is in contact with the information-carrying layer 3, while the metal layer 4 lies between the protective layer 2 and the information layer 3. The metal layer 4 at the same time is the second coupling element 32 of the information carrier 10 in this example, but this is not necessarily the case. A separate layer may be present so as to form the second coupling element 32. The layer 22 of electrically conducting material at the same time forms the first coupling element 31.

Figure 5:
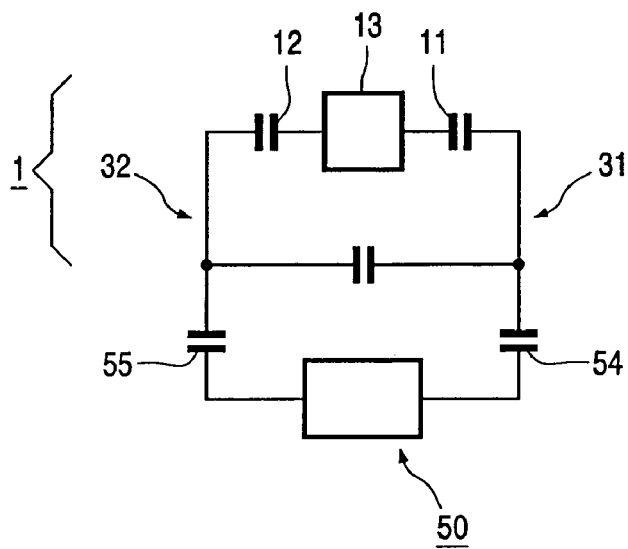
FIG. 5 shows a circuit diagram of a first embodiment of the system.

The transfer of data and energy between the IC 10 and a base station 50—shown in FIG. 7—takes place as follows, as is also shown in the circuit diagram of FIG. 5. Data and energy are supplied from the base station 50 via capacitor plate 54 to the first coupling element 31. This supply takes place in the form of current and voltage. The current preferably has a lower frequency than the voltage, but this is not necessarily the case. The data and energy are conducted further through this coupling element 31 to the conductive plate 11 of the IC 10. After the data have been processed, and possibly stored, by the IC elements 13, a transfer of the processed data with the remaining energy takes place from the conductive plate 12 of the IC to the second coupling element 32. The data and energy are conducted further through this coupling element 32 to the second capacitor plate 55 of the base station 50. This process utilizes alternating current, as is known to those skilled in the art. The transfer capacity is limited by the ratio of the surface area of the coupling element to the distance from the base station 50. If a frequency of 125 kHz is maintained for the current, the minimum capacitance of the capacitor formed between the first coupling element and the base station 50 is found to be 1 pF. If the first coupling element 31 has a surface area of 13 $cm^2$, the distance to the base station 50 may be 1 cm. This distance was found to be satisfactory.

Figure 3:
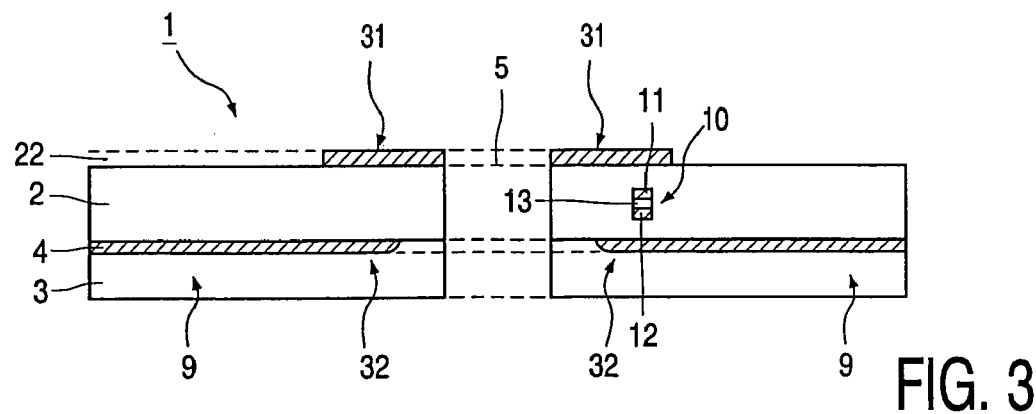
FIG. 3 is a diagrammatic cross-sectional view of a second embodiment of the information carrier.

FIG. 3 is a diagrammatic cross-sectional view of a second embodiment of the information carrier 1. The IC 10 herein is present in the protective layer 2. The layer of conductive material 22 in this example is in contact with the protective layer 2. The layer of conductive material 22 is preferably provided by means of a printing technique in this case. The information carrier in the embodiment may be subdivided into an inner ring, an intermediate ring, and an outer ring. The metal layer 4—and thus the second coupling element 32—is present in the intermediate and the outer ring here. The layer of conductive material 22—and thus the first coupling element 31—is present in the inner and the intermediate ring.

Figure 6:
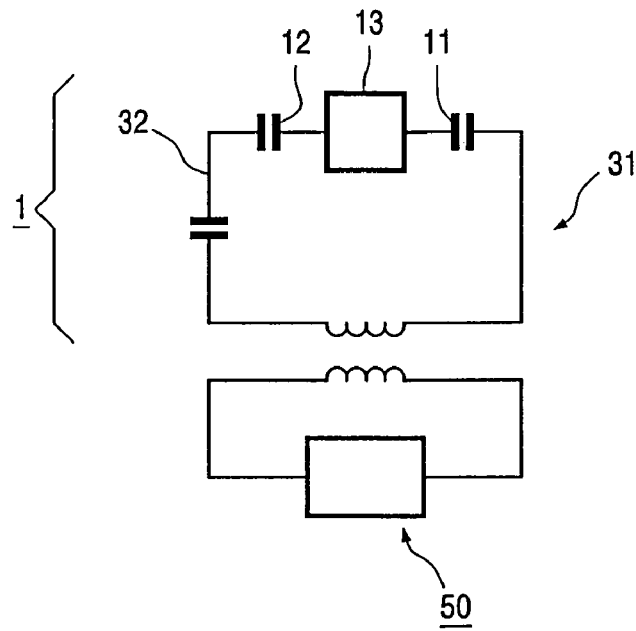
FIG. 6 shows a circuit diagram of a second embodiment of the system.

The information carrier shown in FIG. 3 may also be used in a system in which the first coupling element 31 is inductively coupled to the base station 50. The circuit diagram of this system is shown in FIG. 6. The first coupling element 31 is spiraling in shape here and has a plate-shaped portion opposite the capacitor plate 11 and opposite the second coupling element 32. The second coupling element 32 in this system serves as an intermediate piece between the second conductive plate of the IC 12 and the first coupling element 31. The second coupling element 32 is coupled without direct physical contact to the base station via the first coupling element 31.

Figure 4:
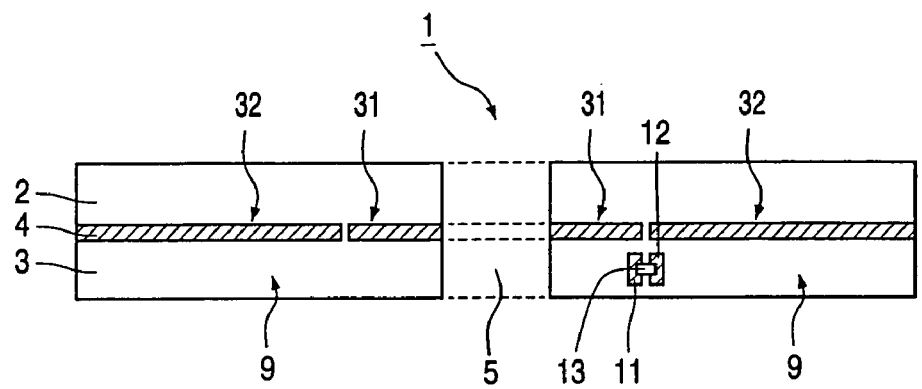
FIG. 4 is a diagrammatic cross-sectional view of a third embodiment of the information carrier.

FIG. 4 is a diagrammatic cross-sectional view of a third embodiment of the information carrier 1. The first 31 and the second coupling element 32 are both realized in the structured metal layer 4 here, which comprises an inner and an outer ring. The IC 10 is provided with conductive plates 11, 12 constructed as SMD contacts for the capacitive coupling of the IC 10 to the two coupling elements 31 and 32.

Figure 7:
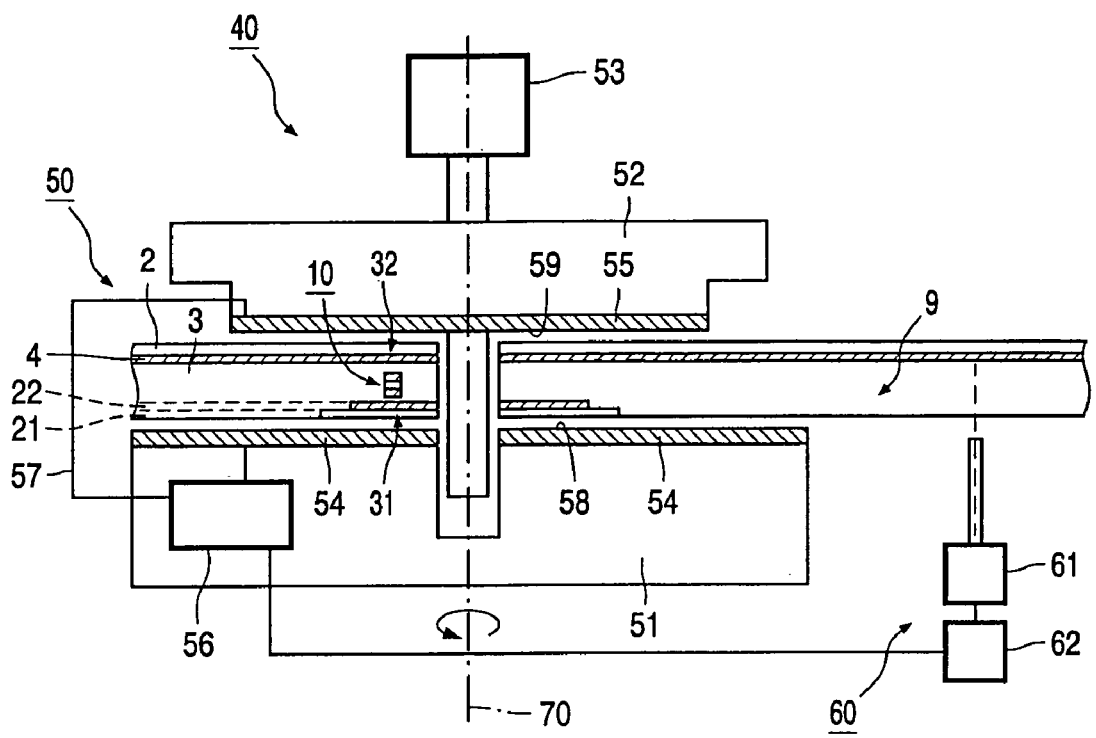
FIG. 7 is a diagrammatic cross-sectional view of a first embodiment of the apparatus in which the information carrier is present.

FIG. 7 is a diagrammatic cross-sectional view of a first embodiment of the apparatus 40 according to the invention in which the information carrier 1 is arranged. The apparatus 40 and the information carrier 1 form the system whose equivalent circuit diagram is shown in FIG. 5. The apparatus 40 is suitable in principle for any of the three embodiments of the information carrier 1 as shown in FIGS. 1, 2, and 3.

The apparatus 40 comprises a base station 50, a device 60 for reading information from the storage unit 9 of the information carrier 1, and mechanical components. The apparatus 40 comprises a carrier body 51 which has a surface 58. The apparatus 40 also comprises a compression body 52 which is connected to an electric motor 53 and causes the information carrier 1 to rotate about an axis 70, as is known to those skilled in the art. Alternatively, the compression body 52 may act as the carrier, or vice versa, as those skilled in the art will understand. If an information carrier 1 is present in the device apparatus 40, the carrier body 51 and the compression body 52 will press against the information carrier 1 in opposed directions, so that the latter will lie in a stable position in the device apparatus 40. The compression body 52 has a surface 59. The surfaces 58 and 59 directly face one another if no information carrier 1 is present in the apparatus 40. The device 60 for reading of information comprises an optical head 61 which is known to those skilled in the art and which is controlled by a control unit 62.

A first capacitor plate 54 of the base station 50 is present at the surface 58 of the carrier body 51. This capacitor plate 54 achieves a capacitive coupling—in this embodiment—to the first coupling element 31 of the information carrier 1. A second capacitor plate 55 of the base station 50 is present at the surface 59 of the compression body 52. This capacitor plate 55 achieves a capacitive coupling—in this embodiment—to the second coupling element 32 of the information carrier 1. The first capacitor plate 54 is connected to the supply and read-out unit 56 of the base station 50 by means of a conductive connection 57 alongside the lateral edge of the information carrier 1, if present. The second capacitor plate 55 is also connected to this unit 56, so that an electric circuit is created.

Figure 8:
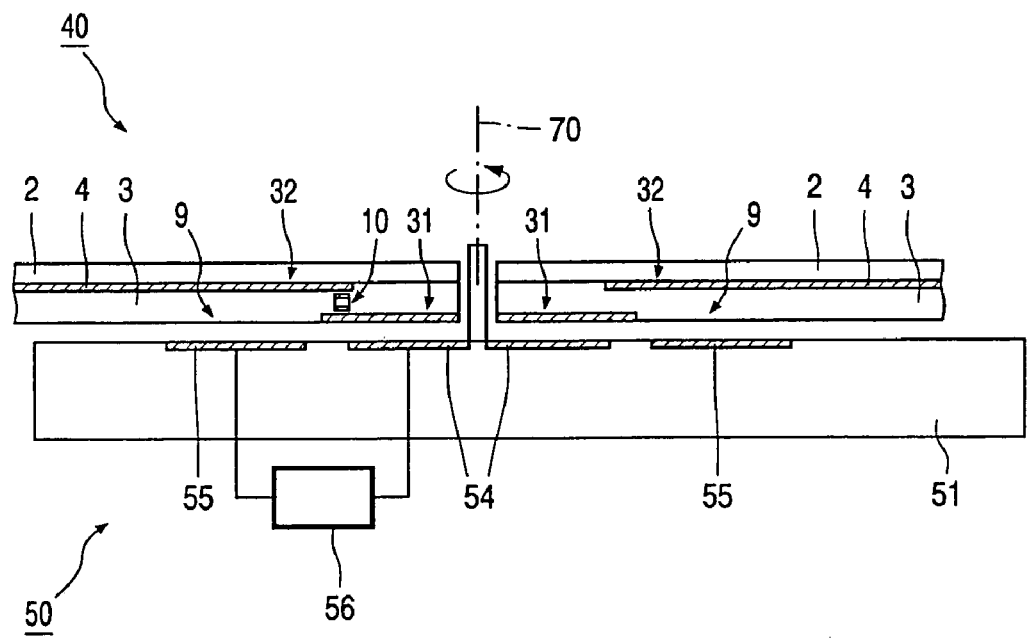
FIG. 8 is a diagrammatic cross-sectional view of a second embodiment of the apparatus in which the information carrier is present.

FIG. 8 is a diagrammatic cross-sectional view of a second embodiment of the apparatus 40 in which the information carrier 1, in one of its embodiments shown, is present. Only the components of the base station 50 are depicted in the apparatus 40 for the sake of clarity. The first 54 and the second capacitor plate 55 in this embodiment both lie in the carrier body 51 instead of on either side of the information carrier 1. The capacitor plates 54, 55 have the shape of concentric rings.

Figure 9:
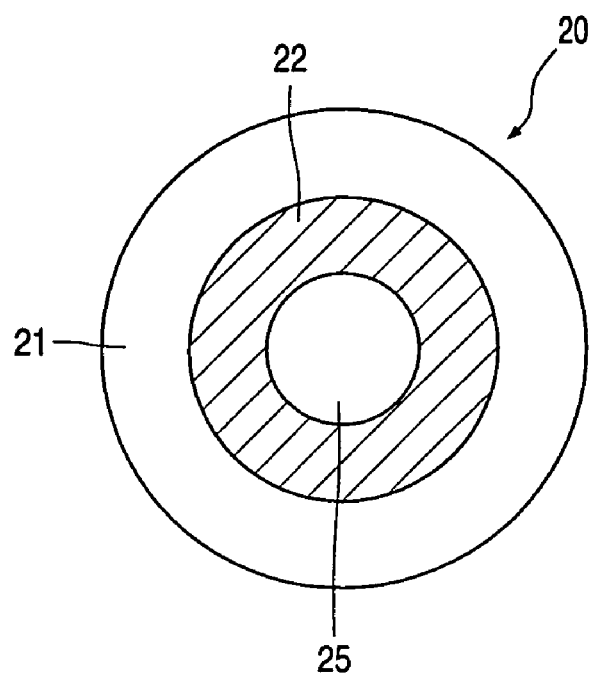
FIG. 9 is a diagrammatic plan view of the substrate.

FIG. 9 is a diagrammatic plan view of the stack 20. This stack 20 comprises a substrate 21, a layer of conductive ink 22, and a glue layer 23. The stack is further provided with a hole 25. This renders the substrate 21 suitable for fastening to a disc-shaped information carrier 1 provided with a hole 5 centrally situated in the information carrier 1 and having a diameter. The hole 25 in the substrate 21 then has a diameter which is at least equal to the diameter of the hole 5 in the information carrier 1.

Figure 10:
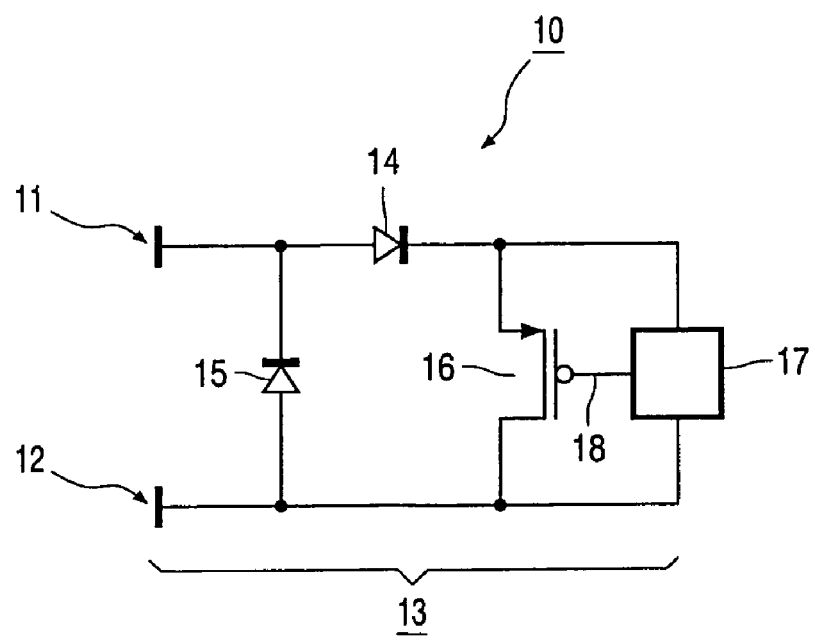
FIG. 10 is a circuit diagram of the integrated circuit in the information carrier.

FIG. 10 is an equivalent circuit diagram of the IC 10. The IC 10 comprises elements 13 in addition to the first and the second coupling element 11, 12. These elements 13 are at least a first diode 14, a second diode 15, an output transistor 16, and a further circuit 17 comprising the memory. The second diode 15 is connected in series with the circuit of the other elements here. The output transistor 16 and the further circuit 17 are also connected in series. The further circuit 17 has an output 18 which controls the transistor 16. The first diode 14 and the output transistor 16 may be integrated into or replaced by a single element. Other modifications of the IC 10 are equally possible, as will be obvious to those skilled in the art.

The invention claimed is:

1. A substrate provided with a layer of conductive ink and a glue layer wherein
   the substrate is suitable for fastening to a disc-shaped information carrier provided with a hole centrally situated in the information carrier and having a diameter, and
   the substrate is provided with a hole having a diameter which is at least equal to the diameter of the hole in the information carrier,
   said glue layer being in contact with said conductive ink, wherein said layer of conductive ink includes an outer ring of conductive ink concentric about the hole in the substrate that is separated from the substrate hole by a non-conductive material.

2. The substrate of claim 1 wherein the substrate is disk-shaped.

3. The substrate of claim 1 wherein the layer of conductive ink includes an inner ring of conductive ink and an outer ring of conductive ink that is separated from the inner ring, the inner and outer rings each being concentric about the hole in the substrate.

4. A substrate provided with a layer of conductive ink and a glue layer wherein
   the substrate is suitable for fastening to a disc-shaped information carrier provided with a hole centrally situated in the information carrier and having a diameter,
   the substrate is provided with a hole having a diameter which is at least equal to the diameter of the hole in the information carrier,
   said glue layer being in contact with said conductive ink, and the layer of conductive ink includes an inner ring of conductive ink and an outer ring of conductive ink that is separated from the inner ring, the inner and outer rings each being concentric about the hole in the substrate.

* * * * *